Jan. 2, 1951 W. SWIFT 2,536,582
TOOL FOR USE IN ARMATURE WINDING MACHINES
Filed Jan. 3, 1950 3 Sheets-Sheet 1
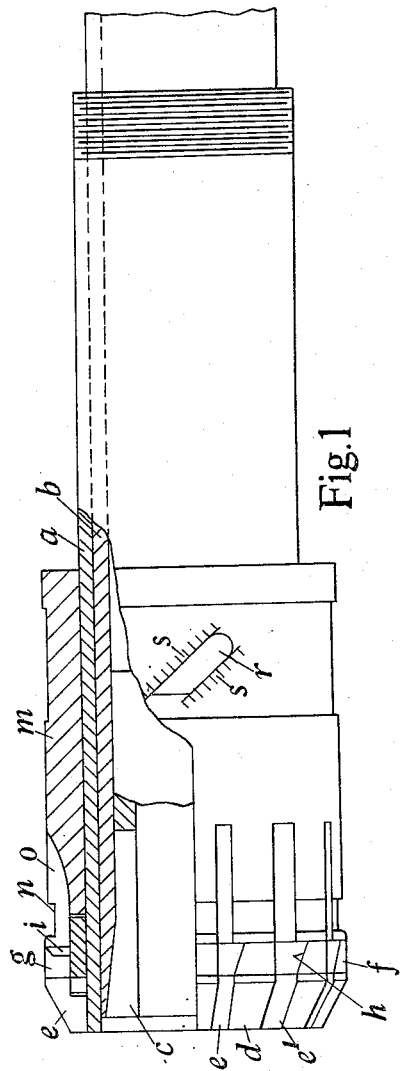
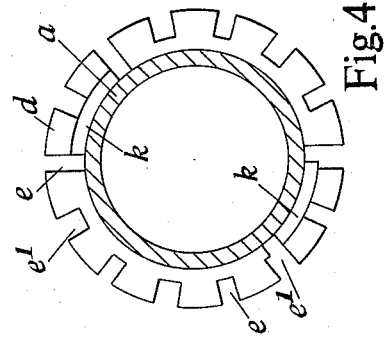
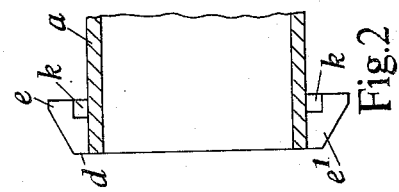
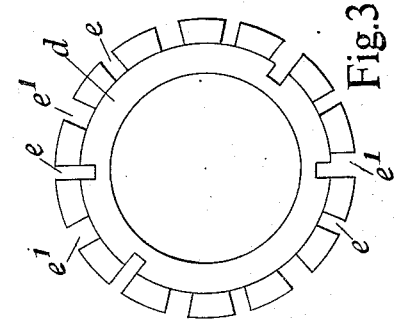
Inventor
W. Swift Jan. 2, 1951 W. SWIFT 2,536,582
TOOL FOR USE IN ARMATURE WINDING MACHINES
Filed Jan. 3, 1950 3 Sheets-Sheet 2

Inventor.
W. Swift
By Attys.

Jan. 2, 1951  W. SWIFT  2,536,582
TOOL FOR USE IN ARMATURE WINDING MACHINES

Filed Jan. 3, 1950  3 Sheets-Sheet 3

Inventor
W. Swift
By Glascock Downing Keeble
Attys.

Patented Jan. 2, 1951

2,536,582

UNITED STATES PATENT OFFICE 2,536,582

TOOL FOR USE IN ARMATURE WINDING MACHINES

William Swift, Sutton Coldfield, England, assignor to Joseph Lucas Limited, Birmingham, England Application January 3, 1950, Serial No. 136,503
In Great Britain January 13, 1949

4 Claims. (Cl. 164—60)

This invention has for its object to provide an improved wire gripping and severing tool for use in a machine for winding the armatures of electric dynamos, motors and the like, the machine being of the kind in which the laying of the wires in longitudinal slots in the armature is effected by relative reciprocatory and angular movements of the armature and the guides which feed the wires to the armature, as, for example, the machine described in the specification of application for British Patent No. 955 of 1949.

The invention comprises the combination of three coaxial parts having mutually adjacent end faces and having around their peripheries grooves correlated with the number of the grooves in the armature to be wound, one of the members being angularly movable relatively to the adjacent member for gripping the wires, and the latter member being angularly movable relatively to the third member for severing the wires.

In the accompanying drawings:

Figure 1 is a half sectional side elevation of a tool embodying the invention.

Figure 2 is a sectional side elevation of the forward portion of one of the components of the tool, and Figure 3 is a front elevation, Figure 4 being a rear elevation.

Figure 7:
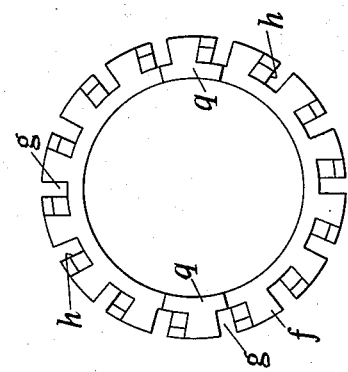
Figures 5, 6 and 7 are respectively a sectional side elevation front and rear elevations of another component of the tool.
Figure 5:
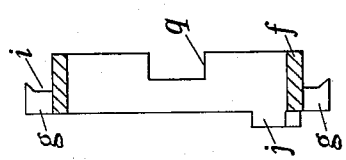
Figure 6:
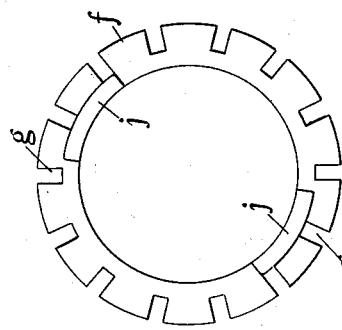

Referring to the drawings, one of the component parts of the tool thereshown comprises a sleeve $a$ (shown in detail at Figures 2–4) adapted to be mounted on the end of a hollow spindle $b$ which is provided with a collet $c$ for gripping one end of a spindle on the armature to be wound. On the forward end of the sleeve $a$ is formed an outwardly extending flange $d$ having a bevelled front side and around the periphery of this flange are formed a number of transverse grooves $e$ for reception of the wires, the number of grooves corresponding to those on the armature. All of these grooves may be of the same width, but preferably the alternate grooves $e^1$ are made wider than the grooves $e$, for the purpose hereinafter described. On the sleeve $a$ is mounted a ring $f$ (shown in detail at Figures 5–7), one face of the ring being in contact with the rear face of the flange. The ring is formed with transverse grooves $g$ corresponding in number to those on the flange $d$, and one side of each groove is chamfered to form a cutting edge $h$ (Figure 1). Also there is formed an annular groove $i$ around the face remote from the said flange, to accommodate parts of the wires to be gripped. The ring is angularly movable relatively to the flange $d$ to a limited extent which is determined by key pieces $j$ projecting laterally from the ring into engagement with wider arcuate slots $k$ in the flange $d$.

Figure 9:
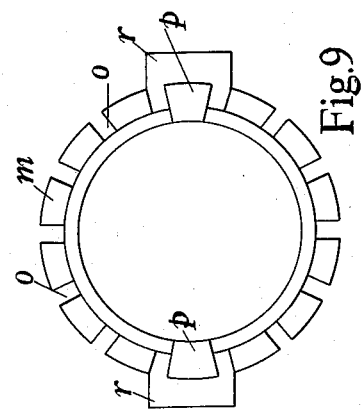
Figure 8:
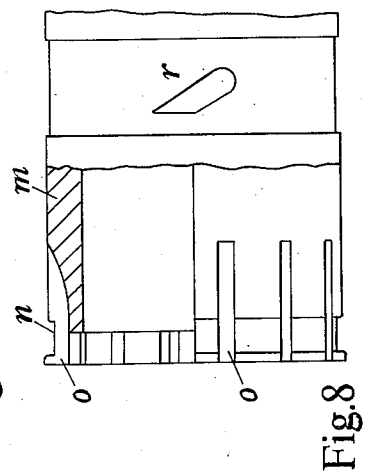
Figure 8 is a sectional side elevation and Figure 9 a front elevation of a portion of a third component of the tool.

The third member (shown in detail by Figures 8 and 9) consists of a sleeve $m$ mounted on the first mentioned sleeve $a$. Adjacent to its forward end (which is in contact with or closely adjacent to the ring $f$) is formed a shallow circumferential groove $n$. Further, there are formed around the forward end of the member $m$ a number of longitudinal grooves $o$ which are similar in number to those on the other two members. The third member $m$ is angularly movable relatively to the ring $f$ and is connected thereto by keys $p$ extending into arcuate slots $q$ at one side of the ring $f$, the slots $q$ being sufficiently wider than the key $p$ to allow the desired relative angular movement.

Any convenient means are employed for effecting the relative angular movements of the tools. In one arrangement a pair of obliquely arranged and diametrically opposite radial projections $r$ on the sleeve $m$ engage complementary abutments $s$ on a surrounding slidable member, so that axial movements of the latter can effect angular movements of the sleeve $m$ and thence the ring $f$ relatively to the part $a$.

Figure 10:
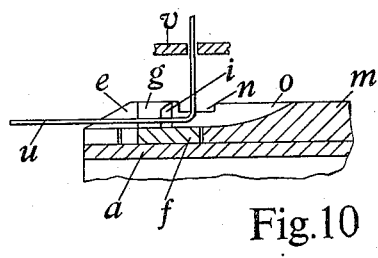
Figures 10–13 are diagrammatic fragmentary views illustrating the mode of action of the tool.
Figure 11:
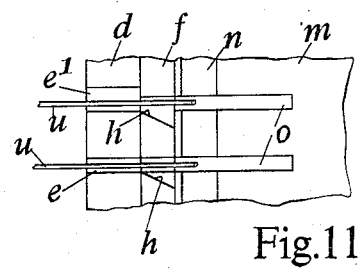
Figure 12:
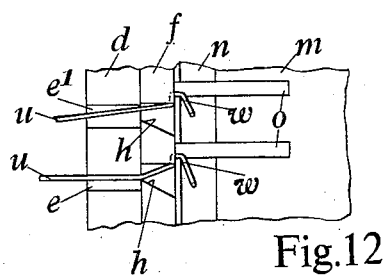
Figure 13:
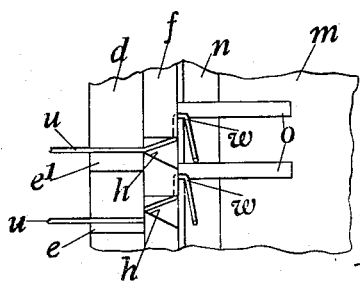

The above described tool is more particularly intended for use in a machine such as that described in the specification of British patent application No. 955 of 1949 above mentioned. At the end of each cycle of operations the wires $u$ (which are fed from reels through guides as $v$) (Figure 10) occupy the positions shown in Figures 10 and 11. An axial movement imparted to the part $s$ results in a corresponding angular movement of the member $m$, causing the wires $u$ to be kinked as indicated by $w$ (Figure 12) by the relative movement between the parts $m$, $f$. A continued movement of the part $s$ finally imparts a joint angular movement to the parts $m$, $f$, for severing the wires as shown in Figure 13, when the lost motion afforded by the keys $p$ and the slots $q$ is taken up. As the severing of all the wires simultaneously involves (in some cases) the application of a heavy torsional force to the tool, it is preferable to sever the wires in stages. In the first stage the alternate wires occupying the narrower grooves $e$ are first cut (as shown in Figure 13) and continued movement then severs the wires occupying the wider grooves $e^1$; hence the reason for making the grooves $e^1$ wider than the grooves $e$. After the cutting of the wires, the armature is removed, and an unwound armature is placed in position, the kinked ends of the wires being held gripped by the parts $m$, $f$, in readiness for the next winding operation. This is effected as described in the specification above mentioned, the gripped ends of the wire being released and withdrawn towards the end of the operation, leaving the tool ready for re-engagement with the wires fed through the guides as shown in Figure 10.

By this invention the gripping and severing of the wires in a fully automatic armature winding machine are effected in a very simple and convenient manner. Whilst the tool above described is more particularly intended for use in the winding machine described in the above mentioned specification, it may also be used in other forms of armature winding machines.

Having thus described my invention what I claim as new and desire to secure by Letters Patent is:

1. For use in an armature winding machine, a wire gripping and severing tool comprising the combination of three coaxial parts having mutually adjacent end faces and having around their peripheries grooves correlated with the number of the grooves in the armature to be wound, one of the members being angularly movable relatively to the adjacent member for gripping the wires, and the latter member being angularly movable relatively to the third member for severing the wires.

2. A tool as and for the purpose claimed in claim 1, in which the parts are interconnected by key pieces adapted to permit relative angular movement of two of the parts for gripping the wires, and subsequent joint movement of the said parts relatively to the third part for severing the wires.

3. A tool as and for the purpose claimed in claim 2, in which one of the parts is provided with at least one oblique lateral projection adapted to co-operate with a complementary slidable abutment for effecting angular movement of the said part.

4. A tool as and for the purpose claimed in claim 1, in which one of the parts is formed with a circumferential groove, and in which the adjacent face of the adjacent part is formed with an annular groove, to accommodate the portions of the wires to be gripped between the said parts.

WILLIAM SWIFT.

No references cited.